(12) United States Patent
Seo et al.

(10) Patent No.: US 8,516,287 B2
(45) Date of Patent: Aug. 20, 2013

(54) COMPUTER SYSTEM FOR INTERRUPTING A COMMUNICATION FUNCTION AND CONTROL METHOD THEREOF

(75) Inventors: Bum-hee Seo, Seoul (KR); Cheon-moo Lee, Gyeonggi-do (KR); Kwang-yong Lee, Gyeonggi-do (KR); Sang-jin Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 299 days.

(21) Appl. No.: 12/860,129

(22) Filed: Aug. 20, 2010

(65) Prior Publication Data

US 2011/0087816 A1    Apr. 14, 2011

(30) Foreign Application Priority Data

Oct. 14, 2009    (KR) .................. 10-2009-0097938

(51) Int. Cl.
*G06F 1/32*    (2006.01)

(52) U.S. Cl.
USPC .. 713/324; 713/320; 361/679.26; 361/679.55

(58) Field of Classification Search
USPC ................ 713/300, 320, 324; 361/679.02, 361/679.21, 679.26, 679.27, 679.55
See application file for complete search history.

(56) References Cited

U.S. PATENT DOCUMENTS

| | | | | |
|---|---|---|---|---|
| 7,310,740 | B2 * | 12/2007 | Price et al. | 713/320 |
| 7,428,142 | B1 * | 9/2008 | Ligtenberg et al. | 361/679.55 |
| 8,121,810 | B2 * | 2/2012 | Witte et al. | 702/150 |
| 2004/0227407 | A1 * | 11/2004 | Nagai | 307/112 |
| 2007/0089311 | A1 * | 4/2007 | Amundson et al. | 33/355 R |
| 2008/0089260 | A1 * | 4/2008 | Tsukamoto et al. | 370/311 |
| 2010/0100202 | A1 * | 4/2010 | Chen et al. | 700/75 |
| 2011/0154502 | A1 * | 6/2011 | Prakash et al. | 726/26 |
| 2012/0015671 | A1 * | 1/2012 | Lada | 455/456.1 |
| 2012/0072752 | A1 * | 3/2012 | Kennedy et al. | 713/323 |

FOREIGN PATENT DOCUMENTS

JP    2008129833 A  *  6/2008

OTHER PUBLICATIONS

Machine generated English translation of JP 2008129833A, Tsukamoto et al., published Jun. 5, 2008.*
eMachines 5000 Series Notebook User's Guide; eMachines, Inc. and Aesbus Knowledge Solutions; 2003.*
eMachines 5000 Series Notebook Wireless Communications Supplement; eMachines, Inc. and Aesbus Knowledge Solutions; 2003.*

* cited by examiner

*Primary Examiner* — Glenn A Auve
(74) *Attorney, Agent, or Firm* — Cha & Reiter, LLC (57) ABSTRACT

A computer system and a control method thereof, the computer system including: a processor which executes a program; a communication unit which communicates with an external device; a main body which is provided with the processor. A cover which can be opened and shut with regard to the main body; an open/shut sensor which senses whether the cover is open or shut; and a controller which interrupts an operation of the communication unit if the open/shut sensor senses that the cover is shut.

22 Claims, 9 Drawing Sheets

COMPUTER SYSTEM FOR INTERRUPTING A COMMUNICATION FUNCTION AND CONTROL METHOD THEREOF

CLAIM OF PRIORITY

This application claims priority from Korean Patent Application No. 10-2009-0097938, filed on Oct. 14, 2009, the entire disclosure of which is incorporated herein by reference.

BACKGROUND OF THE INVENTION

1. Field of the Invention

The present invention relates to apparatuses and methods regarding communications functions of a computer system and a control method thereof. More particularly, the present invention relates to a computer system that can interrupting a communication function.

2. Description of the Related Art

A computer system, such as a laptop, a desktop, notebook, netbook, tablet, etc., includes a communication unit for communicating through a network to perform an Internet function or the like. In general, the communication unit of a computer system regularly performs a basic communication operation in order to request something from a source external to the computer or respond to a request from the outside. As an example of communication operations, a radio frequency (RF) signal is transmitted and received in the case of wireless communication.

However, such communication operations of the computer system consume power, and therefore it is preferable to restrict any unnecessary communication operations if possible. Occasionally, the communication operations of the computer system may not be permitted for security reasons, or because of possible interference with medical equipment. For example, use of a wireless communication function of the computer system is often limited within a hospital, or on board an aircraft.

Thus, at least for the above reasons, the communicating operation of the computer system needs to be controlled properly in accordance with the environmental status (i.e. the environment in which the device is being used.

SUMMARY OF THE INVENTION

Accordingly, one or more exemplary embodiments of the present invention provide a computer system for properly controlling a communications operation in accordance with the environment in which the device is being used, and a control method thereof.

The foregoing and/or other exemplary aspects of the present invention may be achieved by providing a computer system including: a processor which executes a program; a communication unit which communicates with an external device; a main body which is provided with the processor; a cover which can be opened and shut with regard to the main body; an open/shut sensor which senses whether the cover is currently open or shut; and a controller that interrupts an operation of the communication unit if the open/shut sensor senses that the cover is shut.

The controller may resume the operation of the communication unit if the open/shut sensor senses that the cover has been reopened after having been in an interrupted state (i.e. the operation of the communication unit was interrupted and the cover has been reopened.

The computer system may further include an input unit for inputting setup information about whether or not to interrupt the operation of the communication unit, wherein the controller selectively interrupts the operation of the communication unit based on the setup information that was input through the input unit.

The controller may selectively interrupt the operation of the communication unit according to whether or not the communication unit is performing a predetermined certain operation.

The computer system may further include an input unit for receiving a key input of a user, wherein the controller interrupts the operation of the communication unit according to the key input received through the input unit.

Another exemplary aspect of the present invention can be achieved by providing a method of controlling a computer system including a processor having a main body provided with the processor, a cover that can be opened and shut with regard to the main body, and a communication unit communicating with an external device, the method preferably including: ascertaining whether or not the cover is shut; and interrupting an operation of the communication unit if it is determined that the cover is shut.

The method may further include, for example, resuming the operation of the communication unit if it is determined that the cover is open while the communication unit is in an interrupted status.

The method may also further include inputting setup information about whether or not to interrupt the operation of the communication unit, wherein the interrupting the operation of the communication unit includes selectively interrupting the operation of the communication unit on the basis of the input setup information.

The interrupting of the operation of the communication unit may include selectively interrupting according to whether the communication unit is performing a predetermined certain operation.

The method may further include receiving a user's key input corresponding to interruption of the operation of the communication unit; and interrupting the operation of the communication unit according to the user's key input.

BRIEF DESCRIPTION OF THE DRAWINGS

The above and/or other exemplary aspects will become apparent and more readily appreciated from the following description of the exemplary embodiments, taken in conjunction with the accompanying drawings, in which.

DETAILED DESCRIPTION

Figure 1:
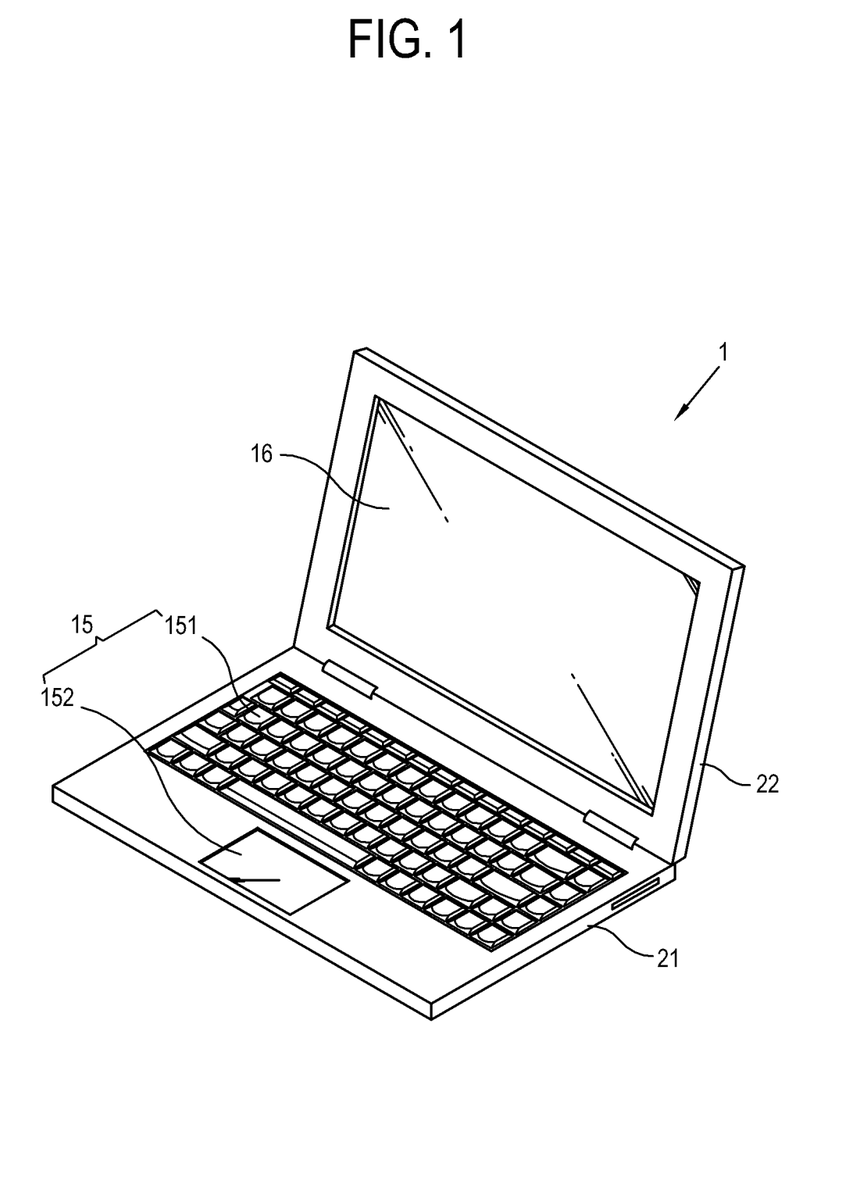
FIGS. 1 and 2 are perspective views showing a computer system according to an exemplary embodiment of the present invention.
Figure 2:
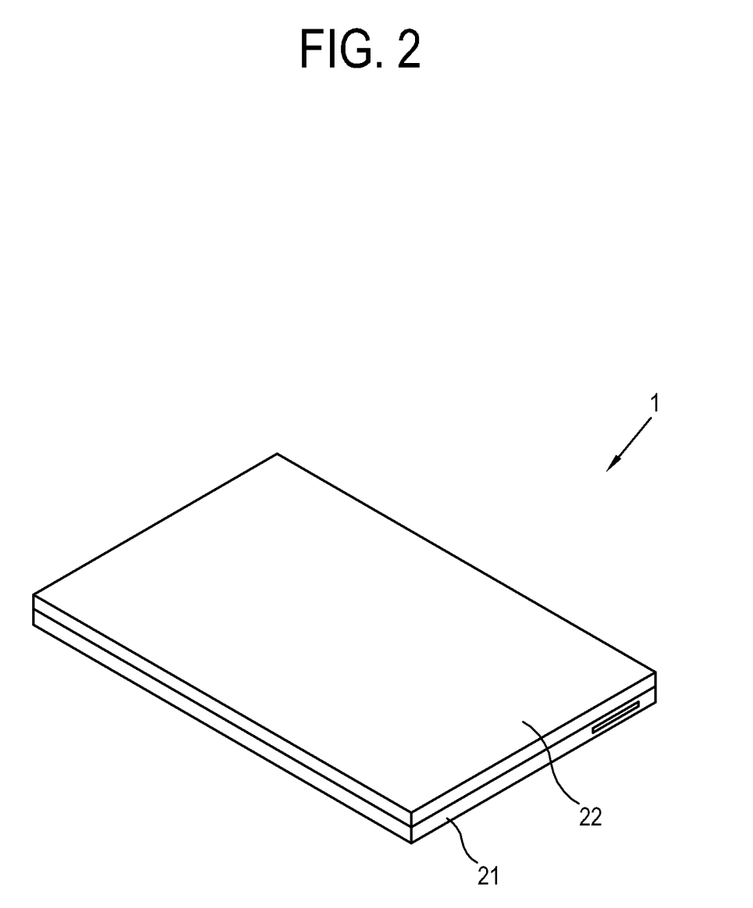

Below, exemplary embodiments of the present invention will be described in detail with reference to accompanying drawings. FIGS. 1 and 2 are perspective views showing a computer system according to an exemplary embodiment of the present invention. FIGS. 1 and 2 show an open state and a shut state of the computer system 1, respectively.

As shown in FIGS. 1 and 2, the computer system 1 in this exemplary embodiment includes a main body 21, and a cover 22 which can be positioned in an open and a shut position with regard to the main body 21 so as to open or shut the computer system. The cover 22 in this exemplary embodiment is hinge-coupled to the main body 21 and can be tilted with respect to the main body 21. FIG. 1 shows an open state that the cover 22 is opened with respect to the main body 21, and FIG. 2 shows a state in which the cover 22 is shut with respect to the main body 21.

Figure 3:
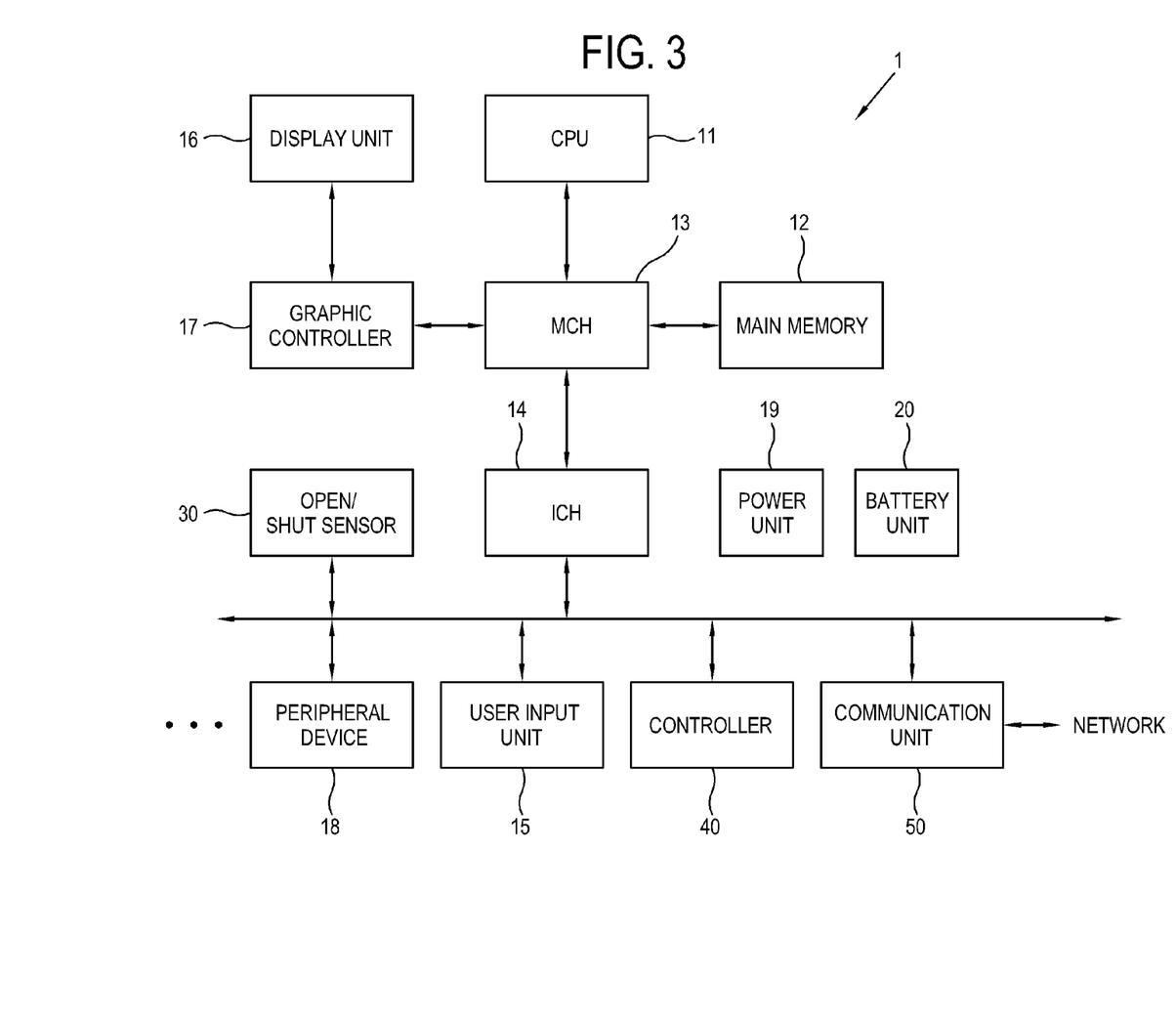
FIG. 3 is a block diagram showing the configuration of the computer system of FIGS. 1 and 2.

The computer system 1 according to an exemplary embodiment of the present invention will now be described in more detail with reference to FIG. 3. FIG. 3 is a block diagram showing the configuration of the computer system in accordance with an exemplary embodiment of the present invention. As shown in FIG. 3, the computer system 1 includes a central processing unit (CPU) 11, a main memory 12, a memory controller hub (MCH) 13, an input/output controller hub (ICH) 14, a user input unit 15, a display unit 16, a graphic controller 17, and a peripheral device 18.

The CPU 11, which controls a general operation of the computer system 1, executes a computer program loaded in the main memory 12. The CPU 11 performs communication with the MCH 13 and the ICH 14 and controls them in light of executing the computer program. The CPU 11 is an example of a processor according to an exemplary embodiment of the present invention.

The main memory 12 temporarily stores data for implementing an operation of the CPU 11 as well as the computer program to be executed by the CPU 11. The main memory 12 may be achieved by a double-data-rate synchronous dynamic random access memory (DDR SDRAM) as one possible example of a volatile memory.

The input unit 15 for receiving a user's input may include a keyboard 151 and a pointing device 152 as shown in FIG. 1. The display unit 16 displays an operating status of the computer system 1, and may be comprised of a liquid crystal display (LCD) or any type of thin film technology. Referring now to FIG. 1, the user input unit 15 and the display unit 16 in this exemplary embodiment may be provided in the main body 21 and the cover 22, respectively.

The graphic controller 17 processes graphic data of an image to be displayed on the display unit 16. The peripheral device 18 may include various hardware components such as a hard disk drive, a flash memory, a compact disc read only memory (CD-ROM) drive, a digital versatile disc read only memory (DVD-ROM) drive, a universal serial bus (USB) drive, a Bluetooth adapter, a modem, a sound card, a speaker, a microphone, a tablet, a touch screen, etc., just to name a few possibilities.

The MCH 13 serves as an interface between the main memory 12 and the other components such as the CPU 11, in order to read and write data. The ICH 14 interfaces communications between the CPU 11 and the peripheral device(s) 18 and controls input/output of the peripheral device(s) 18. In this exemplary embodiment, the computer programs executed by the CPU 11 may include a basic input/output system (BIOS), an operating system, and applications. The BIOS may be stored in a non-volatile memory, i.e., a BIOS ROM (not shown), and the operating system and the applications may be stored in the hard disk drive, by way of a possible example.

The CPU 11 in this exemplary embodiment may be provided inside the main body 21 as being mounted to a main board (not shown). Referring now back to FIG. 3, the computer system 1 according to an exemplary embodiment of the present invention may further include a power unit 19 for supplying power to the foregoing components, and an optional battery unit 20 used as an auxiliary power unit.

Meanwhile, the computer system 1 according to an exemplary embodiment of the present invention further includes a communication unit 50, an open/shut sensor 30, and a controller 40.

The communication unit 50 communicates with an external device (not shown) through a network. In this exemplary embodiment, the communication unit 50 can perform wired communication and/or wireless communication. The wireless communication typically performed by the communication unit 50 includes wireless communication based on a wireless local area network (WLAN). The communication unit 50 may be achieved as a separate device in the form of a card or the like, or provided in the form of a chip on a main board mounted with the CPU 11.

The open/shut sensor 30 senses whether or not the cover 22 is opened or shut with respect to the main body 21.

Figure 4:
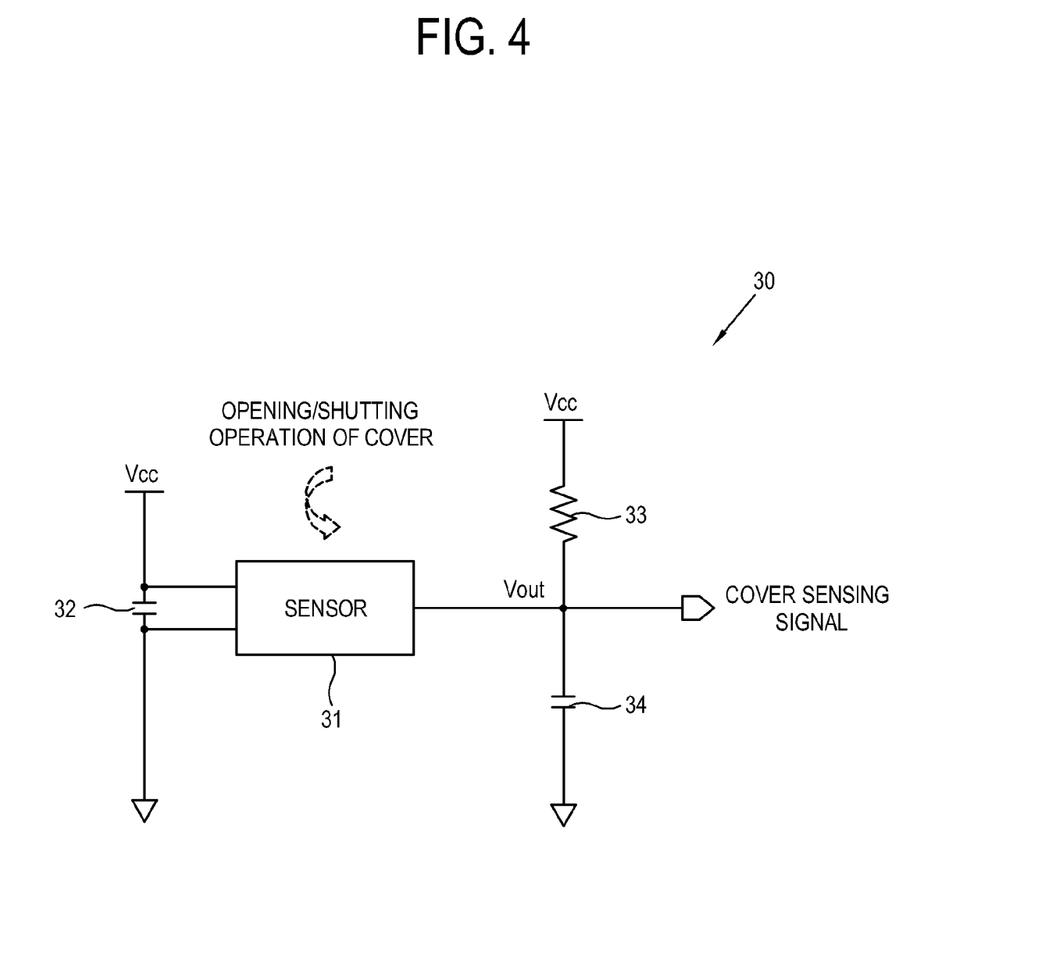
FIG. 4 is a circuit diagram of an open/shut detecting sensor according to an exemplary embodiment of the present invention.

FIG. 4 is a circuit diagram of the opening/shutting sensor 30 according to an exemplary embodiment of the present invention. As shown in FIG. 4, the open/shut sensor 30 in this exemplary embodiment is a unit that may include a sensor 31, a first capacitor 32, a resistor 33, and a second capacitor 34. The sensor 31 senses open/shut operations of the cover 22 with respect to the main body 21. The sensor 31 may comprise a magnetic field sensing system, which can sense a change in a magnetic field around the sensor 31 while the cover 22 is tilted. The opening/shutting sensor 30 outputs a voltage Vout having a level corresponding to a sensing result of the sensor 31, i.e., a cover sensing signal. The cover sensing signal may be a signal having either a high or low level corresponding to one of the open and shut states of the cover 22. A person of ordinary skill in the art understands and appreciates that the sensor could also be an optical sensor, or a tilt sensor such as a mercury switch, etc.

The controller 40 controls the operation of the communication unit 50 on the basis of the open and shut states of the cover 22.

Figure 5:
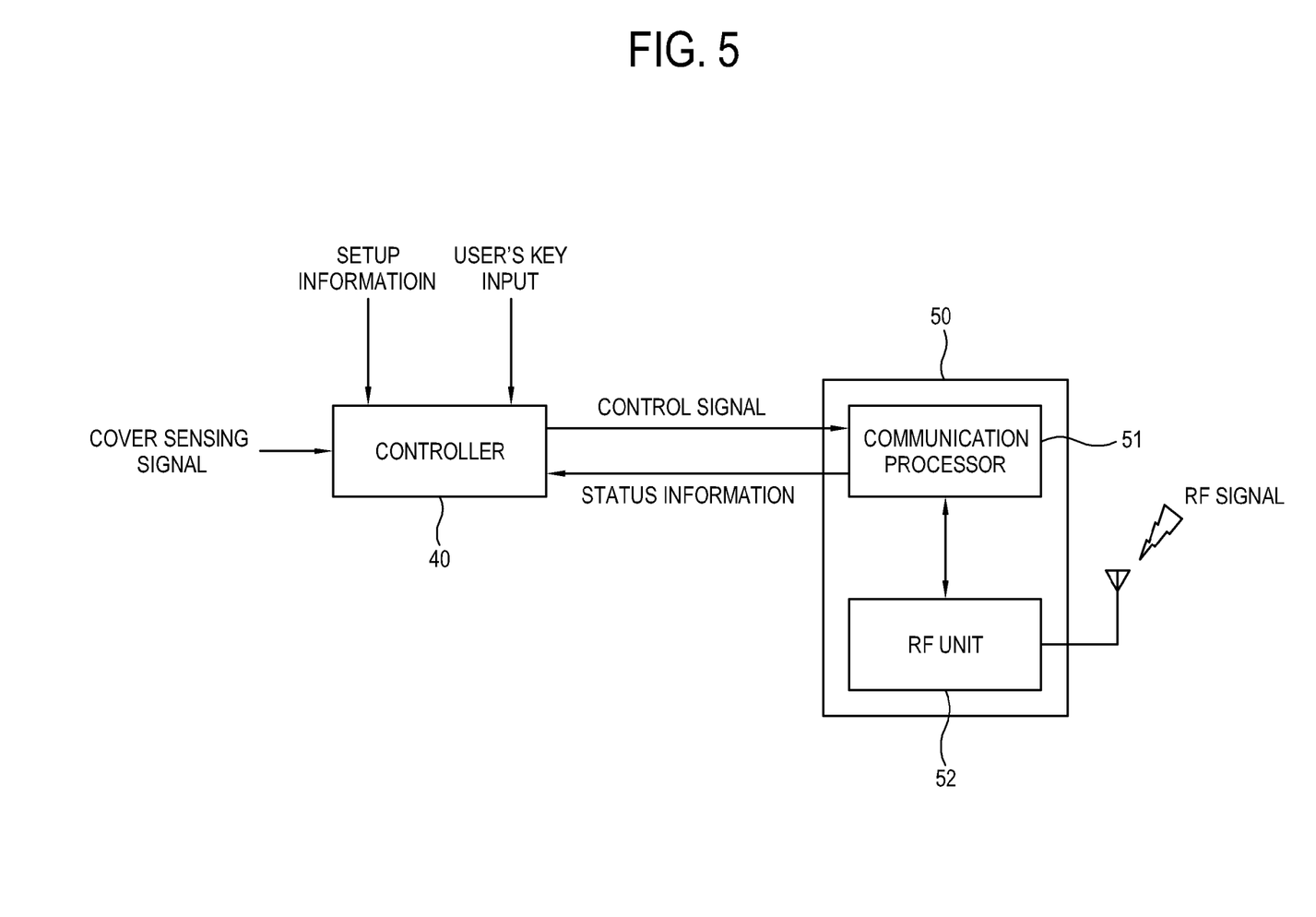
FIG. 5 is a block diagram showing a controller and a communication unit according to an exemplary embodiment of the present invention.

FIG. 5 is a block diagram showing the controller 40 and the communication unit 50 according to an exemplary embodiment of the present invention. The controller 40 receives the cover sensing signal from the open/shut sensor 30, and determines whether the cover 22 is opened or shut on the basis of the received cover sensing signal. For example, the controller 40 may determine that the cover 22 is open if the cover sensing signal is high, and determine that the cover 22 is shut if the cover sensing signal is low.

The controller 40 in this exemplary embodiment interrupts the operation of the communication unit 50 when it is determined that the cover 220 is shut. In this case, the controller 40 may output a control signal for interrupting the operation of the communication unit 50. As shown in FIG. 5, the communication unit 50 in this exemplary embodiment includes a radio frequency (RF) unit 52 to transmit and receive an RF signal, and a communication processor 51 to perform a communicating operation such as a signal process for the RF signal transmitted and received by the RF unit 52. The communication processor 51 interrupts the operation of transmitting and receiving the RF signal in the RF unit 52 when receiving the control signal corresponding to the interruption from the controller 40.

As described above, the computer system 1 in this exemplary embodiment interrupts the operation of the communication unit 50 in the case when the state of the cover 22 is shut (closed), which is generally regarded as not being in use, to thereby minimize unnecessary power consumption, and automatically halts the communication function through a quick state check if the communication function is not allowed, to thereby prevent a relevant problem.

According to another exemplary embodiment, the controller 40 can resume the operation of the communication unit 50, if the cover 22 is opened while the communication unit 50 is in the interrupted state. Similar to the shutting of the cover 22, the controller 40 may output a control signal for resuming the operation of the communication unit 50 when the cover is opened. In this case, the communication processor 51 resumes the operation of transmitting and receiving the RF signal using the RF unit 52 when it receives the control signal corresponding to the resumption of communication by the controller 40. Thus, when a user reopens the cover 22 to use the communication function, the communication function is automatically resumed, thereby providing enhanced convenience to a user.

According to an additional exemplary embodiment of the present invention, the controller 40 may selectively perform the function of interrupting the operation of the communication unit 50 in accordance with predetermined setup information. In this exemplary embodiment of the present invention, the setup information may be inputted by a user through the user input unit 15 (see FIGS. 1 and 3), where such setup information includes information about whether or not a user permits the function of interrupting the operation of the communication unit 50 to occur. The computer system 1 in this exemplary embodiment may cause the setup information input through the input unit 15 to be stored in a predetermined non-volatile memory (not shown). The controller 40 determines whether or not to perform the function of interrupting the operation of the communication unit 50 on the basis of the setup information stored in the memory when the cover 22 is shut. For example, if a user sets up the setup information not to implement the function of interrupting the operation of the communication unit 50, the controller 40 maintains the operation of the communication unit 50 without performing the function of interrupting the operation of the communication unit 50 even in the case when the cover 22 is shut. Thus, if a user does not want the function of interrupting the communication, it is reflected in the operation, thereby providing enhanced convenience to a user. According to an additional exemplary embodiment, when a user inputs the setup information, the controller 40 in this embodiment may control the display unit 16 to display a user interface (UI, not shown) for allowing him/her to input the setup information.

According to an additional exemplary embodiment of the present invention, the controller 40 may selectively perform the function of interrupting the operation of the communication unit 50 according to whether or not the communication unit 50 is performing a predetermined certain operation. For example, if the communication unit 50 is receiving certain data requested by a user from an external device via a wired or wireless connection, the controller 40 keeps the operation of the communication unit 50 even though the cover 22 is shut. When the cover 22 is shut, the controller 40 may ask information about a current operating status of the communication unit 50 and determine whether to perform the function of interrupting the operation on the basis of the information received from the communication unit 50. Thus, if the communication unit 50 is performing a necessary operation, the communication function is not interrupted, thereby enhancing the reliability of the operation.

According to an additional exemplary embodiment of the present invention, the controller 40 may control the operation of the communication unit 50 in response to a user's instruction as well from sensing the opening/shutting of the cover 22. In this exemplary embodiment, a user's instruction for interrupting the communication function may be input through the user input unit 15. For example, the user input unit 15 may include at least one key corresponding to the interruption of the communication function. In this exemplary embodiment, at least one key corresponding to the interruption of the communication function may be achieved by a keyboard 151 shown in FIG. 1. Although the cover 22 is open, the controller 40 may interrupt the communication operation of the communication unit 50 when receiving a user's key input corresponding to the interruption of the communication operation through the user input unit 15. Meanwhile, the user input unit 15 may additionally include a key corresponding to the resumption of the communication function, and the controller 40 may control the communication unit 50 to resume the communication operation when the key corresponding to the resumption of the communication function is pressed in the state that the communication function is interrupted. Thus, in addition to the automatic interruption/resumption of the communication function depending on the state of the cover 22, a user's positive intention of interrupting or resuming the communication function is reflected to the operation, thereby providing enhanced convenience to a user.

In this exemplary embodiment, the controller 40 may be achieved by a microprocessor that executes an independent program separately from the CPU 11.

FIGS. 6 to 9 are flowcharts showing exemplary operation of the computer system 1 according to an exemplary embodiment of the present invention.

Figure 6:
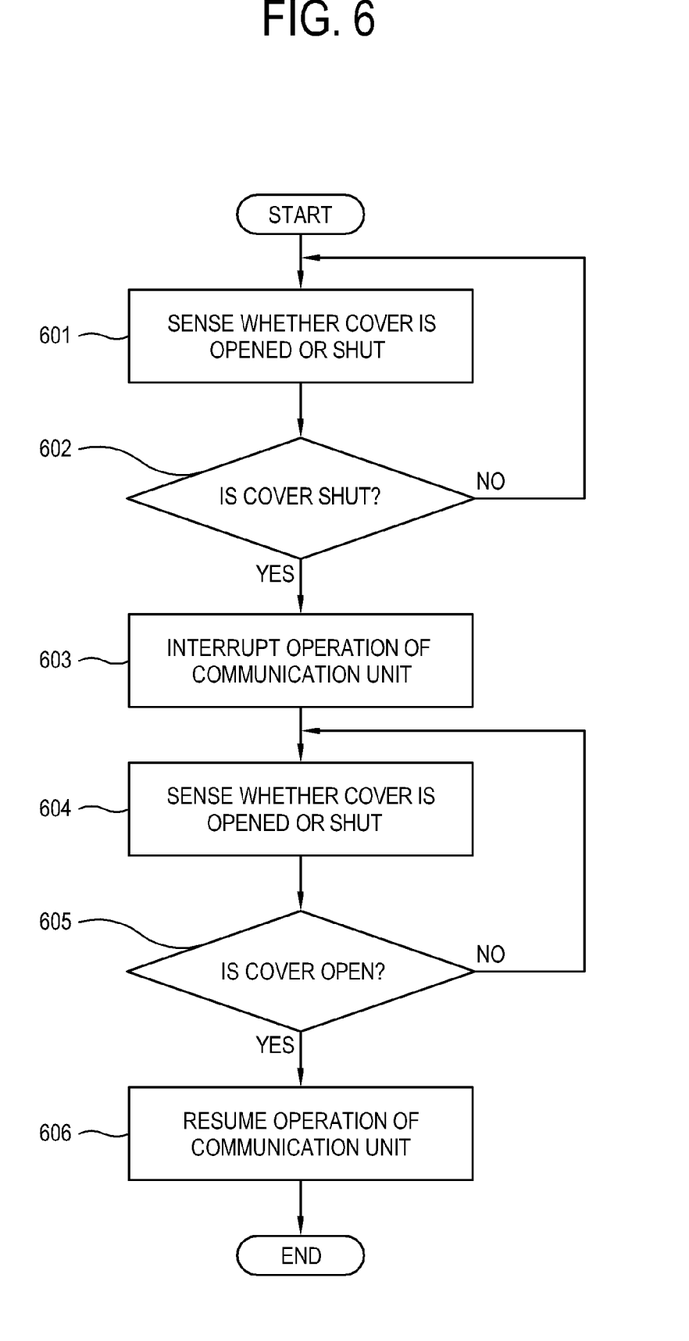
FIGS. 6 to 9 are flowcharts showing exemplary operations of a computer system according to an exemplary embodiment of the present invention.

First, referring now to FIG. 6, the opening/shutting sensor 40 senses whether or not the cover 22 is open or shut at operation 601. At operation 602, the controller 40 ascertains whether or not the cover 22 is shut on the basis of the cover sensing signal input from the open/shut sensor 30. As a result of the ascertaining operation 602, if it is determined that the cover 22 is not shut, the operation 601 is repeated. On the other hand, as a result of the ascertaining operation 602, if it is determined that the cover 22 is shut, the controller 40 interrupts the communication operation of the communication unit 50 at operation 603.

According to another exemplary embodiment of the present invention, in the state that the communication operation of the communication unit 50 is interrupted, the open/shut sensor 30 continues to sense the open/shut state of the cover 22 at operation 604. At operation 605, the controller 40 ascertains whether or not the cover 22 is open on the basis of the cover sensing signal input from the opening/shutting sensor 30. As a result of the ascertaining operation 605, if it is determined that the cover 22 is not open, the operation 604 is repeated. On the other hand, as a result of the ascertaining operation 605, if it is determined that the cover 22 is open, the controller 40 resumes the communication operation of the communication unit 50 at operation 606.

Figure 7:
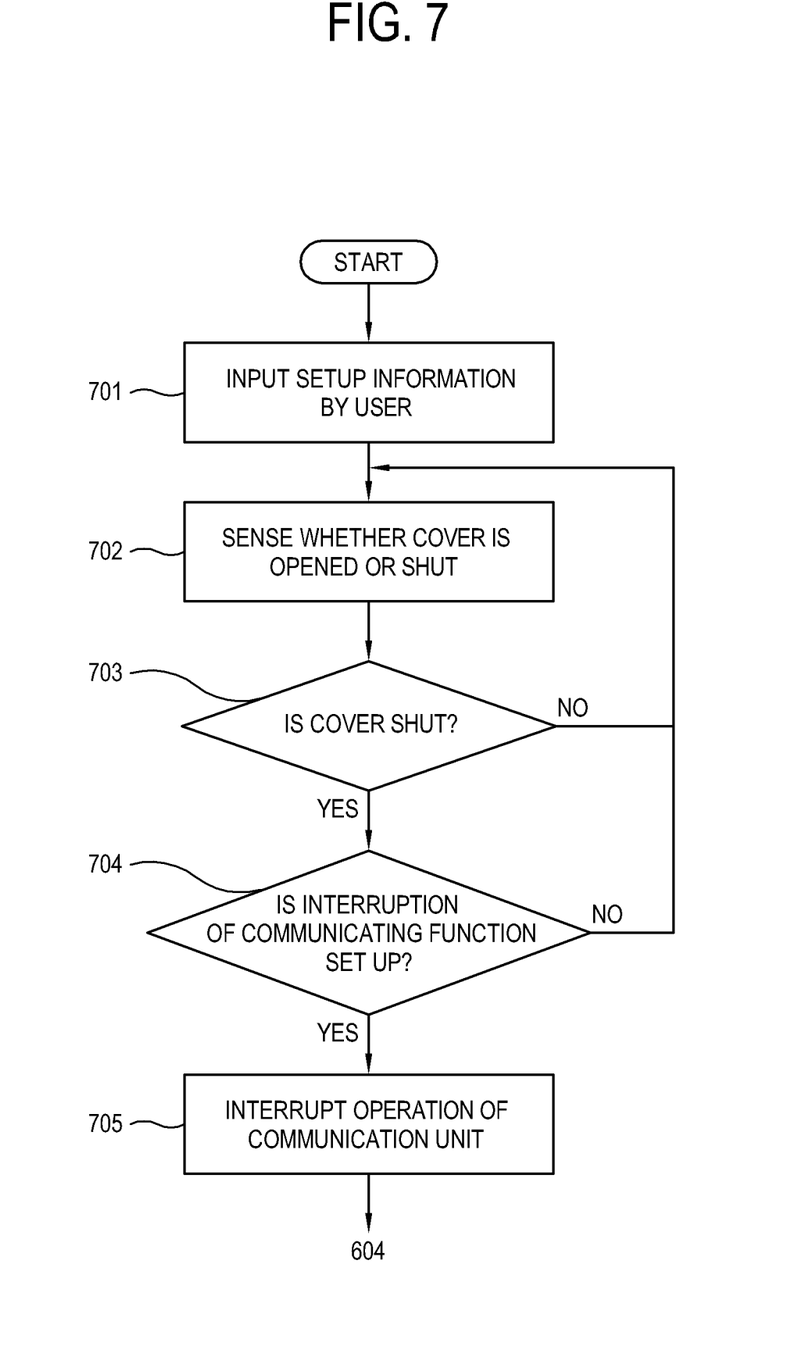

According to another exemplary embodiment of the present invention, referring now to FIG. 7, the setup information about whether to interrupt the communication function is input by a user through the user input unit 15 at operation 701. Also, at operation 702, the opening/shutting sensor 30 senses whether or not the cover 22 is open or shut. The order of the operations 701 and 702 may be inverted, or the operations 701 and 702 may be performed at the same time. At operation 703, the controller 40 ascertains whether the cover 22 is shut on the basis of the cover sensing signal input from the open/shut sensor 30. As a result of the ascertaining operation 703, if it is determined that the cover 22 is not shut, the operation 702 is repeated. On the other hand, as a result of the ascertaining operation 703, if it is determined that the cover 22 is shut, at operation 704 the controller 40 ascertains whether or not the interruption of the communication function is set up, on the basis of the setup information input through the user input unit 15, in which the setup information includes information about whether to interrupt the communication function. As a result of the ascertaining operation 704, if it is determined that the interruption of the communication function is not set up, and the operation 702 is repeated. On the other hand, as a result of the ascertaining operation 704, if it is determined that the interruption of the communication function is set up, the controller 40 interrupts the communication operation of the communication unit 50 at operation 705. Additionally, the operations 604 through 606 of FIG. 6 may be performed after the operation 705.

Figure 8:
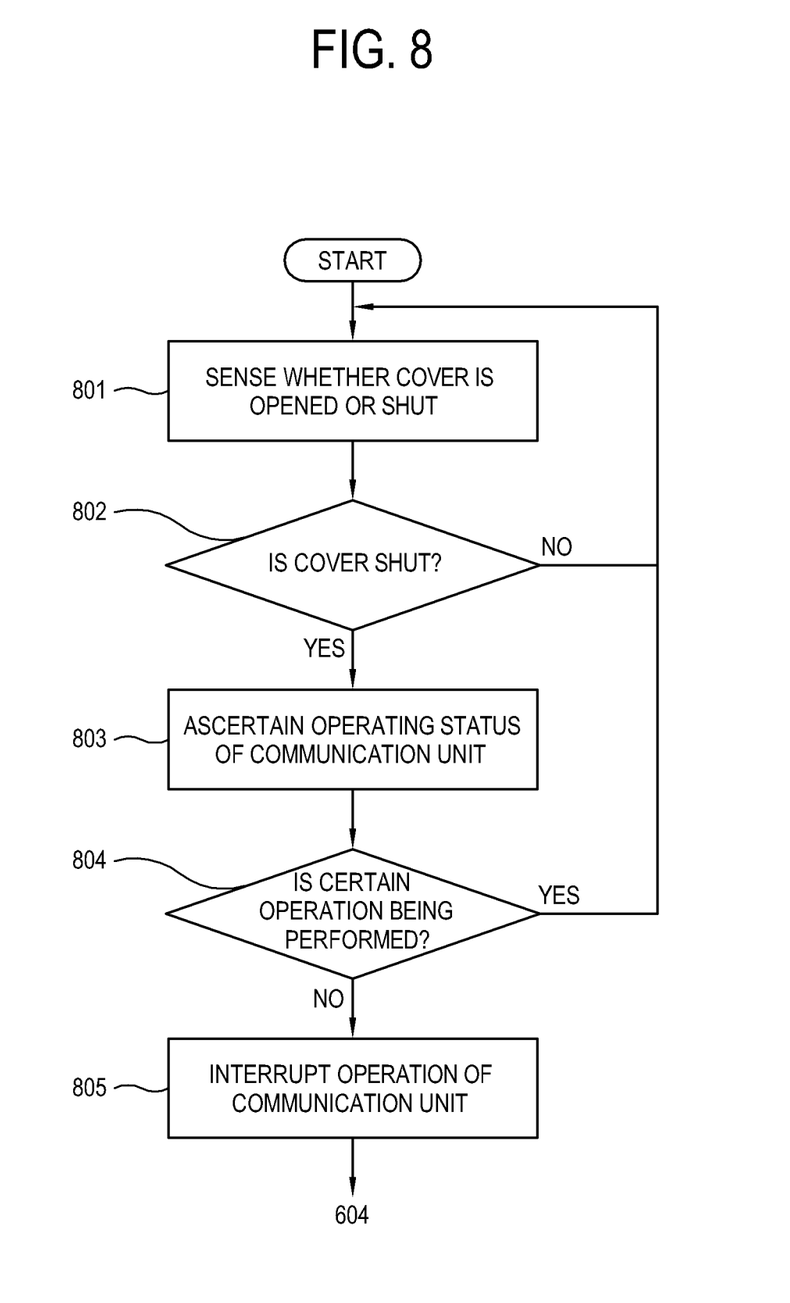

According to another exemplary embodiment of the present invention, referring now to FIG. 8, the open/shut sensor 30 senses the open/shut state of the cover 22 at operation 801. At operation 802, the controller 40 ascertains whether or not the cover 22 is shut on the basis of the cover sensing signal input from the open/shut sensor 30. As a result of the ascertaining operation 802, if it is determined that the cover 22 is not shut, the operation 801 is repeated. On the other hand, as a result of the ascertaining operation 802, if it is determined that the cover 22 is shut, the controller 40 ascertains the operation of the communication unit 50 at operation 803. As a result of the ascertaining operation 803, if it is determined that the communication unit 50 is performing a certain operation at 'Yes' of operation 804, the operation 801 is repeated. On the other hand, as a result of the operation 802, if it is determined that the communication unit 50 is not performing the certain operation at 'No' of operation 804, the controller 40 interrupts the communication operation of the communication unit 50 at operation 805. Additionally, the operations 604 through 606 of FIG. 6 may be performed after the operation 805.

Figure 9:
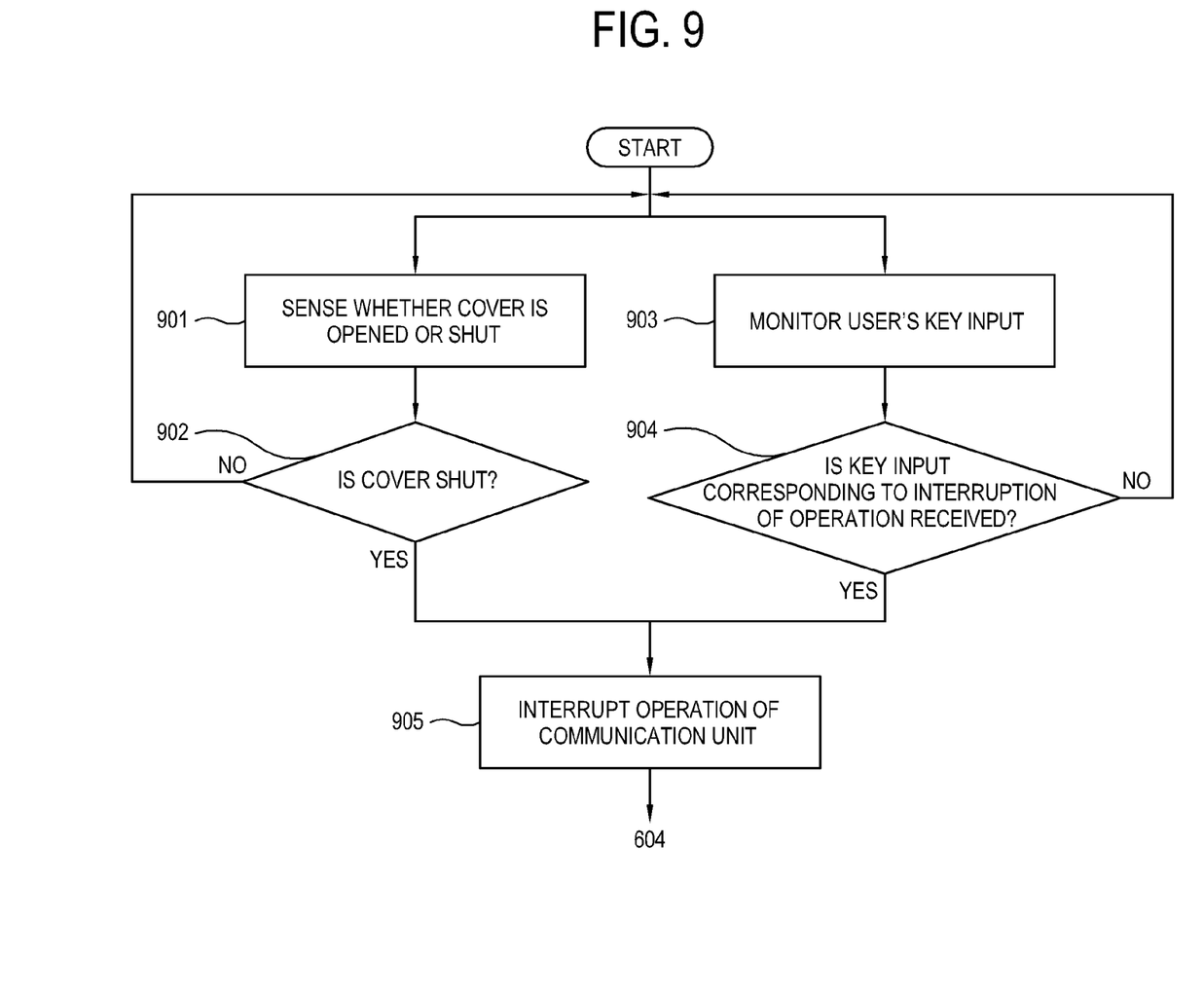

According to another exemplary embodiment of the present invention, referring now to FIG. 9, the open/shut sensor 30 senses the open/shut state of the cover 22 at operation 901. At operation 902, the controller 40 ascertains whether or not the cover 22 is shut on the basis of the cover sensing signal input from the open/shut sensor 30. As a result of the ascertaining operation 902, if it is determined that the cover 22 is not shut, the operation 901 is then repeated. In parallel with the operations 901 and 902, the controller 40 monitors whether or not a key corresponding to the interruption of the communication function is input through the input unit 15 at operation 903. As a result of the operation 903, if it is determined that there is no key input corresponding to the interruption of the communication function at 'No' of operation 904, the operation 901 is repeated. On the other hand, if it is determined that the cover 22 is shut at 'Yes' of the operation 902 as a result of the operation 902, or if it is determined that the key corresponding to the interruption of the communication function is input at 'Yes' of the operation 904 as a result of the operation 904, then the controller 40 interrupts the communication operation of the communication unit 50 at operation 905. Additionally, the operations 604 through 606 of FIG. 6 may be performed after the operation 905.

As described above, according to an exemplary embodiment, a communication operation can be properly controlled in accordance with a current use state of the computer system. Thus, the computer system does not implement unnecessary communication operation, thereby minimizing the power consumption of the system, and preventing a problem from arising under the condition that use of a communication function is not allowed.

The above-described methods according to the present invention can be realized in hardware or as software or computer code that can be stored in a recording medium such as a CD ROM, a RAM, thumbnail drive, a floppy disk, a flash storage, a hard disk, or a magneto-optical disk or downloaded over a network, so that the methods described herein can be executed by such software using a general purpose computer, or a special processor or special microprocessor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A computer system comprising:
   a processor which controls a general operation of the computer system;
   a communication unit for communicating with an external device during a predetermined operation, and for providing status information about the predetermined operation;
   an input unit for receiving input information into the computer system; and
   a controller which transmits a status inquiry about the predetermined operation to the communication unit, wherein the controller interrupts or does not interrupt the predetermined operation of the communication unit based on the status information received from the communication unit.

2. The computer system according to claim 1, wherein the input information from the input unit is setup information.

3. The computer system according to claim 1, wherein the input information is a key input received by the input unit of the computer system.

4. The computer system according to claim 1, further comprising:
   a main body provided with the processor;
   a cover having an open position and a shut position with regard to the main body; and
   an open/shut sensor which detects when the cover is in the open position or the shut position.

5. The computer system according to claim 4, wherein the controller resumes the operation of the communication unit when the open/shut sensor detects that the cover is in the open position subsequent to the operation of the communication unit being interrupted.

6. The computer system according to claim 5, wherein the open/shut sensor comprises an optical sensor.

7. The computer system according to claim 5, wherein the open/shut sensor comprises a magnetic field sensing system that can sense a change in a magnetic field around the open/shut sensor while the cover is in a tilted position.

8. The computer system according to claim 1, wherein the communication unit communicates with the external device via a wireless network.

9. A method of controlling a computer system comprising a processor, a controller, an input unit for receiving input information into the computer system, and a communication unit communicating with an external device during a predetermined operation, the method comprising:
transmitting a status inquiry about the predetermined operation from the controller to the communication unit;
receiving status information about the predetermined operation at the controller from the communication unit; and
interrupting or not interrupting the predetermined operation of the communication unit using the controller based on the status information received at the controller.

10. The method according to claim 9 wherein the computer system further comprises a main body provided with the processor and a cover having an open position and a shut position with regard to the main body, the method further comprising resuming operation of the communication unit if it is determined that the cover is in the open position subsequent to the operation of the communication unit being interrupted.

11. The method according to claim 9 further comprising storing the setup information in a memory of the computer system.

12. The method according to claim 9, wherein interrupting the operation of the communication unit is based on a key input receiving by the input unit.

13. A method of controlling a computer system comprising a processor, a controller, an input unit for receiving input information into the computer system and a communication unit communicating with an external device during a predetermined operation, the method comprising:
transmitting a status inquiry about the predetermined operation from the controller to the communication unit;
receiving status information about the predetermined operation at the controller from the communication unit; and
interrupting or not interrupting the predetermined operation of the communication unit using the controller based on whether or not the communication unit is performing the predetermined operation identified in the status information as being a necessary operation.

14. The method according to claim 13, wherein the computer system further comprises a main body provided with the processor and a cover having an open position and a shut position with regard to the main body, the method further comprising resuming operation of the communication unit if it is determined that the cover is in the open position subsequent to the operation of the communication unit being interrupted.

15. The method according to claim 13, wherein the step of interrupting also comprises interrupting the operation of the communication unit according to a key input received by the input unit.

16. The method according to claim 13, wherein the step of interrupting also comprises interrupting the operation of the communication unit based on input information received by the input unit.

17. The method according to claim 13, wherein the step of interrupting also comprises interrupting the operation of the communication unit based on information stored in the computer system where such information is setup information received by the input unit.

18. A computer system comprising:
a processor which controls a general operation of the computer system;
a communication unit for communicating with an external device during a predetermined operation, and for providing status information about the predetermined operation;
an input unit for receiving input information into the computer system; and
a controller which receives input information from the input unit and exchanges a status inquiry from the controller and the status information about the predetermined operation with the communication unit where the controller interrupts or does not interrupt the predetermined operation of the communication unit based on whether or not the communication unit is performing the predetermined operation defined in the status information as being a necessary operation.

19. The computer system according to claim 18 further comprising:
a main body provided with the processor;
a cover having an open position and a shut position with regard to the main body; and
an open/shut sensor which detects when the cover is in the open position or the shut position.

20. The computer system according to claim 19 wherein the open/shut sensor comprises an optical sensor.

21. The computer system according to claim 19 wherein the open/shut sensor comprises a magnetic field sensing system that can sense a change in a magnetic field around the open/shut sensor while the cover is in a tilted position.

22. The computer system according to claim 19 wherein the controller resumes the operation of the communication unit when the open/shut sensor detects that the cover is in the open position subsequent to the operation of the communication unit being interrupted.

* * * * *